United States Patent [19]

Mundy, Jr. et al.

[11] Patent Number: 4,656,656
[45] Date of Patent: Apr. 7, 1987

[54] CALL-ACCOUNTING SYSTEM

[75] Inventors: Thomas C. Mundy, Jr.; Frank Ingle, both of Jacksonville, Fla.

[73] Assignee: Mundy Communications Corporation, Jacksonville, Fla.

[21] Appl. No.: 700,812

[22] Filed: Feb. 11, 1985

[51] Int. Cl.$^4$ ........................................... H04M 15/34
[52] U.S. Cl. ..................................... 379/113; 379/120
[58] Field of Search ........................ 179/7.1 R, 7.1 TP; 172/2 DP

[56] References Cited

U.S. PATENT DOCUMENTS

| | | | |
|---|---|---|---|
| 3,160,709 | 12/1964 | Burke | 179/7.1 TP |
| 3,400,222 | 9/1968 | Nightingale et al. | 179/7.1 R |
| 3,663,756 | 5/1972 | Karras et al. | 179/7.1 TP |
| 3,920,912 | 11/1975 | Anderson et al. | 179/7.1 TP |
| 4,090,034 | 5/1978 | Moylan | 179/7.1 R |
| 4,517,411 | 5/1985 | Casner | 179/7.1 TP |

*Primary Examiner*—James L. Dwyer
*Attorney, Agent, or Firm*—Thomas H. Murray; Clifford A. Poff

[57] ABSTRACT

A data-collection and -processing system is integrated with an existing Private Branch Exchange (PBX) telephone system to provide a highly automated telephone-usage accounting and billing tool for use in hospitals and other similar institutions having a large and transient clientele base. The system consists of four separate computer systems connected together (and the required applications software which enables them to function as an integrated system) and miscellaneous peripheral hardware.

Working together, the system components provide a detailed accounting of long-distance calls placed by guests and staff personnel. A very high degree of reliability is achieved by the use of redundant and self-checking components. This reliability is further enhanced by the provision for remote software maintenance and hardware diagnosis.

15 Claims, 1 Drawing Figure

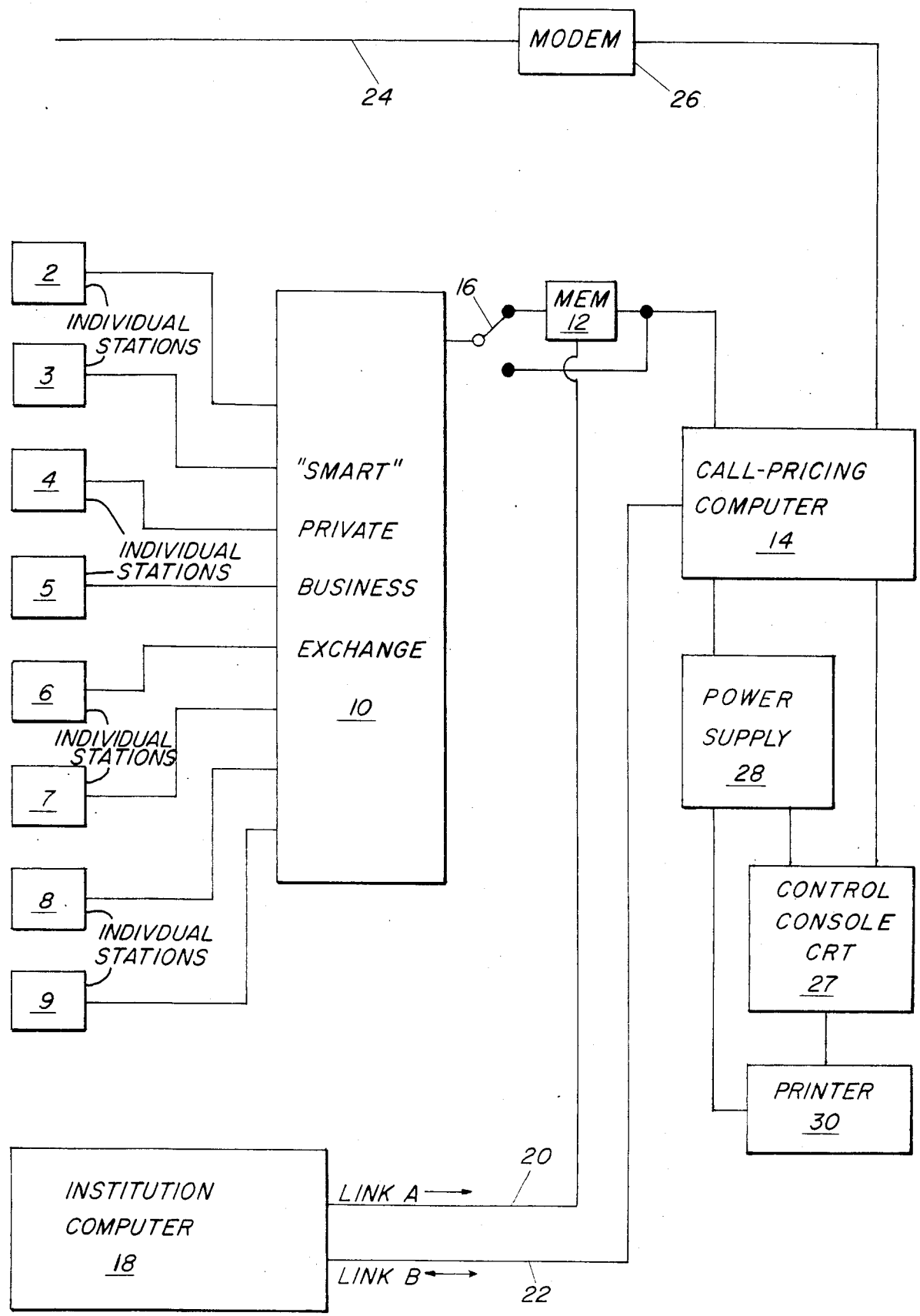

CALL-ACCOUNTING SYSTEM

BACKGROUND OF THE INVENTION

1. Field of the Invention

This invention relates to apparatus and methods for recording, computing and billing the long-distance or toll calls made by various persons (guests or patients and staff) in an institution having a transient population, such as a hospital, hotel, motel, or company corporate headquarters.

2. Description of the Prior Art

Forty or fifty years ago, what is accomplished with the present invention was done, if at all, by the personal attention of one of the institution's switchboard operators and the bookkeeping personnel of the institution. Initially, we had neither telephone equipment that would produce the sort of signals required for this sort of system, nor the electronic computers to receive, store, and manipulate (calculate) the signals, nor the output or display systems (printers, CRT screens) that make such a system practical. When computers were first invented, they were for many years too large, cumbersome, expensive, difficult to program and/or unreliable for any system such as that herein disclosed to be practical.

The basic problem of recording data concerning toll calls made from different identifiable stations of a telephone system, and computing bills for each station, is one that is faced not only by a hospital or hotel but also by the telephone company itself, and it is not surprising that, because of the greater volume of calls to be handled and bills to be calculated and prepared, the principal early advances towards solving the problem of generating proper statements were made by the telephone company. As any telephone customer knows, there are now prepared monthly statements of long-distance calls which are to a great extent, if not always entirely, generated by automatic computer equipment. This implies that the telephone company has, some time ago, solved the problem of connecting individual stations to a call-pricing computer and a backup memory, and connecting the computer to appropriate printer means.

This all does not solve the problems which confront the administrator of a hospital or hotel with respect to providing individual statements for patients or guests. It does not provide any sort of record independent of that made by the telephone company, so that any telephone-company errors in billing could be detected. It also does not give the administrator what he needs in terms of prompt statements and useful reports, because he has patients or guests leaving the premises who should be required to pay before they depart, and he also wishes to be alerted promptly if there is any instance of heavy use or of the making of unauthorized calls. Moreover, especially in hospitals, a given patient is not infrequently moved from one room to another during his stay, so that what the telephone company wants to produce (a month-end statement of all calls from a given extension) is not useful to the administrator, because it comes too late and does not break down the charges into the ones attributable to the individuals who have used that extension during that month, and it also does not assemble into one statement the calls made by a patient from the various rooms that he occupied during his stay. The alternative of having all long-distance calls routed to a telephone-company human operator who makes the necessary records is available, but it is more costly for the patient or guest, depriving him of any chance to take advantage of the lowest rates for direct-dial, non-operator-assisted calls.

It needs to be admitted that at least some of the individual components which are required for the functioning of a system according to the present invention have, per se, been known before now.

For example, there are about fifty known, commercially available systems known as "Call Detail Recording" or "Station Message Detail Reporting," and any of these may be added as a feature to an existing institution PBX.

Another component of this apparatus of the present invention which may be taken as already known per se is a suitable call-record storing system, such as the known COM DEV Model STU-4 pollable call-record storage device. It is known in the art to use such a device in store-and-forward applications which enable remote batch processing of stored call-detail-recording (CDR) records; it is believed to be novel to use such a device as a back-up memory system which is activated if a call-pricing computer is not operating.

It can also be taken as known that there is existing computer equipment which is suitable for use as a call-pricing computer in a system such that proposed in accordance with the present invention. For example, there exists a computer known as a Zilog Series 8000 Model 11 mini-computer, which features a Z 8000 CPU, a random-access memory of 512,000 bytes, a 19 MB hard disc, a 17 MB streaming tape cartridge, and 8 input-output terminal ports. This or any other computer of substantially equivalent or greater capabilities of speed, storage, and input-output could be used. The existence of such commercially available hardware does not, it must be understood, imply that it would be obvious to surround it with the other means taught and disclosed herein to arrive at an apparatus which serves the purposes of the present invention.

The prior art has been such that (1) there are no interim reports about heavy or expensive usage of long-distance facilities unless a human operator is used, (2) there are no immediate reports about placing of unauthorized calls, and (3) previous systems have not provided for the possibility of having the equipment locally present at a hospital or hotel connected telephonically to a remote location which has "Reset After Malfunction" capabilities, i.e., the existing equipment utilized at hotels and hospitals does not provide for a telephone link which will make it possible to perform remotely the diagnosis and the correction, by reprogramming or otherwise, of existing problems. It is believed that in the hospital industry, a two-way link between the institution's computer for generating patient bills and a telephone-call-pricing computer also is novel and unique.

SUMMARY OF THE INVENTION

A data-collection and -processing system is integrated with an existing Private Branch Exchange (PBX) telephone system to provide a highly automated telephone-usage accounting and billing tool for use in hospitals and other similar institutions having a large and transient clientele base. The system consists of four separate computer systems connected together (and the required applications software which enables them to function as an integrated system) and miscellaneous peripheral hardware.

Working together, the system components provide a detailed accounting of long-distance calls placed by guests and staff personnel. A very high degree of reliability is achieved by the use of redundant and self-checking components. This reliability is further enhanced by the provision for remote software maintenance and hardware diagnosis.

An extensive set of reports and transactions provide for correct handling of many difficult but typical health-care-related needs which have been lacking in previous offerings addressed to this market.

DESCRIPTION OF THE DRAWING

The above and other objects and features of the invention will become apparent from the following detailed description taken in connection with the accompanying drawings which form a part of this specification, and in which:

the sole FIGURE is a schematic block diagram showing the interconnection of the four computer systems discussed above.

DESCRIPTION OF THE PREFERRED EMBODIMENTS

PRIVATE BRANCH EXCHANGE 10

Please refer to the FIGURE. A number of individual stations, such as those indicated at 2 to 9, inclusive, are connected to a PBX 10. The Private Branch Exchange (PBX) telephone system 10 is a computer whose primary responsibility is to route telephone calls. Such a system is a requirement for hospitals and other institutions providing telephone service to a large client population. Such a system is, therefore, always provided in a site which would have need of the invention under discussion, and is the focal point for the incorporation of the institution's existing telephone system in the invention.

There are only two special requirements for the PBX 10 which might not be implemented prior to the installation of this invention. First, each patient (or guest) must have his own Main Station telephone instrument to allow calls to be billed to the single responsible party. Some hospitals have both of the patients in a semi-private room share one telephone instrument, but for this system to work correctly, such sharing must be first be eliminated. This feature may be easily provided by adding telephone instruments in semi-private rooms, unless the PBX is already configured at its capacity.

Second, the PBX 10 (or an accessory) must provide a stream of special data records which relate the details of every call handled by the system. This feature is known variously as Call Detail Recording (CDR) or Station Message Detail Reporting, depending on the manufacturer. CDR may be added to virtually any PBX now in use. Software provided with the invention allows it to accept any of the roughly 50 different CDR record formats in use today.

The CDR record provides the following details: digits dialed, trunk group used, originating Main Station number (extension number), the time the call was initiated (or alternatively, finished), and the duration of the call, for each call originated within the building(s) served. The PBX may optionally be programmed to report only certain calls which are of interest for resale purposes; however, this is not a requirement. The format of the call records conforms to the RS-232C standard for asynchronous data transmission.

BACK-UP MEMORY SYSTEM 12

The CDR records are first routed to a COM DEV Model STU-4 pollable call-record storage device 12, which accomplishes three functions. First, it converts each call record received from the data format appropriate for the generating PBX to a standard format known as the COM DEV record format. Second, it passes a copy of the translated record on to the Call-Pricing Computer 14. Finally, it stores a copy of the translated call record in its own internal random-access memory banks. This internal random-access memory has a capacity of 7,000 call records and is erased every 24 hours as long as the Call-Pricing Computer 14 is functioning. If the Call-Pricing Computer 14 should fail, then the call records saved here would be retrieved automatically when the Call-Pricing Computer 14 has recovered. The call records stored in the memory of the Back-up Memory System 12 are protected from power failure by a built-in battery which insures that there would never be an interruption to the internal RAM memory which would cause erasure. A remote alarm unit (not shown) for the Back-up Memory System warns the operator of a power failure or memory-overflow condition.

All of the features described above are features normally provided in the COM DEV STU-4 unit; however, the use of the system in this configuration as a back-up memory system is a novel concept. The STU-4's intended application is in store-and-forward applications which enable remote batch processing of stored CDR records.

BACK-UP MEMORY BYPASS SWITCH 16

In the event of a failure of the Memory unit 12, the unit 12 may be bypassed by a bypass switch 16 which effectively removes the Memory unit 12 from the link between the PBX 10 and the Call-Pricing Computer 14. This action also eliminates the translation feature of the Memory unit 12; however, software in the Call-Pricing Computer 14 automatically detects the change in format and performs the necessary translation internally. This component 16 provides additional reliability to the system. Hence, either the Memory unit 12 or the Call-Pricing Computer 14 may be out of service for up to several days without the loss of any significant amount of data.

CALL-PRICING COMPUTER 14

The heart of the system is the Call-Pricing Computer 14. This unit 14 is preferably implemented with a Zilog Series 8000 Model 11 mini-computer. It features a Z 8000 CPU, 512 K RAM, 19 MB hard disc, a 17 MB streaming tape cartridge, and 8 terminal ports. Any computer offering comparable storage and speed capabilities could conceivably be used for this application. Of the eight input-output ports, one is dedicated to the Memory unit 12, one to the institution computer 18, and one to a modem 26. The remaining ports are available to support up to five user terminals.

Stored on hard disc within the computer is the data base, which contains information used in the preparation of all reports furnished by the system. This data base is constantly being updated by the applications software in response to call records received from the PBX and operator input from terminals.

Contained in the memory of the computer 14, there is preferably a program (the PIPE or PBX Input Processing Executive program) which runs continuously, awaiting the receipt of a call record from the PBX unit 10 or the backup Memory unit 12 or directives from an operator of the system. Upon receipt by the computer 14 of a call record, the computer 14 thus substantially immediately determines whether the call requires some particular action. A free call, for example, does not require any action. But this program in the computer 14 does various things. First, it prices the call. Second, it posts the call record and price against the account of the outlet from which the call was made. Third, whenever the number and/or value of calls coming from a particular station exceeds some predetermined threshold amount, it automatically generates a suitable output report or signal. It is within the skill of the art, to generate such a program; indeed, such a program is commercially available. It is thus to be understood that we have had, prior to this invention, a call-pricing computer that has been provided with such a program, but not one that was integrated into a suitable system possessed by a hospital or similar institution and capable of operating to provide the institution with interim billings and the other useful reports and information generated by the system of the present invention.

DATA BASE OF COMPUTER 14

The data base installed on the Call-Pricing Computer 14 consists of a collection of files which fall into one of two basic categories: working files and data-base files. Working files are those containing information which typically is in a state of continuous change. These files reflect the current status of the system at any given moment. For example, the TRUNKS file contains information on the month-to-date usage of each toll-bearing trunk installed in the PBX, including the number of calls handled to date, the dollar volume of the cost of these calls, the dollar volume of the revenue of these calls, the amount of traffic handled on these trunks during their busiest hour this day, and the time of the busiest hour so far this day.

Data-base files, on the other hand, do not typically change during the course of a day, and reflect those parameters unique to the particular installation being serviced. Included in the data-base files is all of the information necessary to price any long-distance call from the client's location to virtually any city in the world over any type of line available to the PBX at that site.

All files in the system are maintained on a hard disc located in the cabinet of the Call-Pricing Computer 14. All data-base files are also copied to a magnetic-tape cartridge every night during a reset procedure to provide a back-up copy of these files in case of disc failure. All parameters unique to a particular site are set forth on the data-base files, rather than the applications software, allowing the operating environment of a particular site to be easily duplicated on another computer by loading these files from tape. This feature allows ease of software maintenance because software failures may be duplicated on a headquarters computer by simply reloading the failing site's files onto the headquarters computer from tape and duplicating the sequence leading to the software failure.

TERMINAL INTERFACE AND REPORT GENERATOR

In order for the system to be kept abreast of events taking place which have an impact on the system operation (such as the admission or discharge of a patient), a special package of software has been provided to allow the system operator to interact with the system. This software package is known as the "Terminal Interface and Report Generator" package.

There is a kind of transaction which may be called an "admission transaction." When a patient or guest is admitted to the institution, the system operator indicates to the system which telephone main station the guest is to be assigned to and also furnishes a 7-digit patient ID number to provide positive identification for billing purposes. The use of the patient ID number by the system allows proper billing of calls, even when a patient is transferred to a new room during his visit.

A similar transaction, called a "discharge transaction," indicates to the system when a patient is being discharged. Immediately upon discharge, the patient's long-distance bill is generated and printed at the system operator's position, so that the institution may collect for the phone calls prior to the patient's departure from the building. The status of the patient's room/bed is also immediately changed to vacant in the system's working files, so that any further calls from the phone by that bed will be identified as possibly unauthorized.

In the event of an unauthorized phone call, an audible warning is sounded and a written record of the call details (including cost) is printed at the system operator's console, so that the system operator may take immediate steps to correct the irregularity. This feature is an important feature which is unique to this invention.

The need for admission and discharge transactions outlined above may be eliminated by having the Hospital Business Computer 18 provide the required information to the Back-up Memory System 12. Such a fully automated system requires the Hospital Business Computer 18 to be linked electronically to the Back-up Memory System 12, and for special admission and discharge records to be forwarded to the Back-up Memory System 12 as soon as received by the Hospital Business Computer 18. Additional information on this approach may be found below under Hospital Business Computer 18.

A third approach for handling admission and discharge transactions is to allow hospital personnel, such as hosts, transportation clerks, or nurses, to accomplish the transaction from the patient's bedside by dialing a special 4-digit code on the patient's phone. In the case of an admission, this 4-digit code would be followed by the 7-digit patient ID.

Because of administrative errors (such as entering an admission transaction late) it may become necessary for the system operator to make adjustments in the patient's bill prior to discharge. The Terminal Interface and Report Generator package also provides for debit, credit and delete-last-call transactions. The credit transaction would also be used when an interim payment was received from a patient prior to discharge.

The results of the transactions described above (admission, discharge, debit, credit, and delete-last-call) is a single record which is passed to PIPE whose form is similar to a call record which would be received from the Back-up Memory System 12. This "dummy call record" contains all of the information necessary for PIPE to bring about the desired changes in the system's working files. There are two important reasons for handling these transactions in this fashion. First, by allowing the PIPE program to be responsible for any actions which write to system working files, the problem of multiple-program contention for the same file is eliminated. This would otherwise be a serious problem for a multi-tasking multi-processing computer system such as this.

The second advantage to the use of "dummy records" is that it allows a very straightforward reconstruction of all or part of a day's worth of processing in a highly automated fashion. For example, in the event of a software failure which caused damage to the working file which contains copies of patient bills, the file could be completely reconstructed by PIPE by having it reprocess all input (call and "dummy") records which had been processed since the last valid copy of the file was archived on tape. This reprocessing ability is a very significant feature of the software which contributes to the system's ability to recover from even the most catastrophic failure with a very minimum of data loss.

RESET

Periodically, the working files of the data base must be "cleaned up." This process is taken care of by a package of programs known as Reset. Actually there are two reset procedures—one nightly and one monthly. The nightly reset is responsible for erasing from the Back-up Memory System 12 all call records which have already been processed by PIPE. This ensures that the Back-up Memory System 12 never exceeds more than about 25% of its capacity unless there is a failure in the Call-Pricing Computer 14. Also, during the nightly reset, the file containing patient's bills is reviewed for any unauthorized calls, and they are printed and then deleted from the file. Additional reports generated at this time include a Daily Trunk Usage Report, which contains information on call volume handled by each trunk group in 24-hour period; a Patient Phone Activity Report, of which shows month-to-date patient-call activity including dollar volume and profits; and a Hospital Census, which lists all patients currently admitted. Finally, a back-up copy of all data-base files is generated and stored on magnetic tape.

Once a month, the file containing administrative longdistance calls is cleared. This is normally scheduled to take place at the same time the local telephone company ends its billing period. Prior to erasure, these files are used to generate a Departmental Long-Distance Usage Report (showing details of every toll call placed during the month by department) and an Administrative Long-Distance Summary Report (summarizing toll usage by department). Finally, all counters reflecting monthly statistics on call volume are reset to zero. Note that the figure contained in the Daily Trunk Usage Report and Patient Phone Activity Report generated at this time should correspond very closely with the bill furnished by the telephone company for the same period. This feature allows the insitution to monitor the entire system's integrity very closely as well as to detect equipment malfunctions and billing errors which are the responsibility of the phone company.

RESET AFTER MALFUNCTION (RAM)

This program is responsible for picking up the pieces after any equipment malfunction or software malfunction, regardless of the cause. The technique used to provide for automatic recovery after malfunction is to have PIPE update a one-record file every time a call record is processed. This file is called LASTREC and always contains a copy of the last call record processed. Since this file resides on hard disc, it is not damaged in the event of a power failure. In the event of a disc failure, all of the data-base file would be restored from tape, including LASTREC, which would still show the exact state of the system the instant the tape was made.

By referring to this file, the RAM program is able to search the contents of the Back-up Memory System 12 and determine exactly which records need to be processed for the system to be caught up. (The records in the Back-up Memory System 12 are stored in chronological order, so all records between the one matching LASTREC and the newest record have yet to be processed.) This searching and catching-up process is accomplished automatically after the operator completes a brief dialogue with the program.

This automatic restart or reset after malfunction capability is a very important feature of this invention not found in competing products.

HOSPITAL BUSINESS COMPUTER 18

In the event that the hospital has a computer in use which handles the billing of patients for services received during their stay in the hospital, a special interface may be provided to interconnect the Hospital Business Computer 18 to the CallPricing Computer. This interface is accomplished through two data links known as Link A 20 and Link B 22.

Link A 20 connected to an input of the Back-up Memory System 12 which was originally provided for a second PBX system. Records transmitted across this link must match the format of a PBX CDR record. They are transmitted in one direction only, that is from the Hospital Business Computer 18 to the Back-up Memory System 12. When received by the Back-up Memory System 12, these records are merged into chronological order with the records coming from the PBX. From here, they are processed by PIPE just like any other call or "dummy" record. The purpose of this link is to allow the Hospital Business Computer 18 to forward the details of admission and discharge transactions to the Call-Pricing Computer 14 and thus eliminate the requirement for redundant data entry on two separate computer systems.

Link B 22 is connected between an input/output port of the Call-Pricing Computer 14 and a similar port on the Hospital Business Computer 18. Its primary purpose is to allow the transmission of line items for posting on a patient's bill from the Call-Pricing Computer 14. These line items would include bills for calls, debit, credit and delete-last-call transactions. It is also possible for the Hospital Business Computer 18 to request any of the system reports over this line, and have them returned almost immediately.

This intercomputer link is a very important feature of the invention and is probably unique in the industry.

REMOTE COMPUTER SUPPORT

By accessing the system over a dial-up telephone line 24 connected to a Modem 26, it becomes possible for service personnel to perform remote software maintenance and remote hardware diagnosis on the entire system. The Call-Pricing Computer 14 can, on demand, provide access to Back-up Memory System 12, terminal equipment, and the Hospital Business Computer Link A 20. The Back-up Memory System 12, in turn, can provide access to the PBX CDR output and the Hospital Business Computer Link B. Thus nearly all functions of the system may be checked remotely, provided the Modem 26 and the Call-Pricing Computer 14 do not fail. This Modem 26 is also used to place nightly calls to company headquarters for the delivery of nightly reports generated during reset.

UNINTERRUPTABLE POWER SUPPLY (UPS) 28

The Call-Pricing Computer 14, the Back-up Memory System 12, the Modem 26, the Control Console CRT 27, and the Console Printer 30 are all powered by an Uninterruptable Power Supply 28 which delivers a carefully filtered and controlled 117 VAC to this equipment, even in the event of a complete loss of conventional power. The UPS 28 is capable of handling the load to about 30 minutes after a power failure. The UPS 28 in turn is connected to the hospital's emergency-power grid where available, which would not normally have a power failure of over 5 minutes duration. Thus the system is essentially immune to power failures and hardware/software problems caused by power-line transients. The key point here is that as long as the telephones in the building are working, there will be a reliable mechanism for recording the details of every toll call, even in the event of equipment-hardware failure and/or software failure. This, in turn, ensures that the institution will not lose revenue or incur unbillable expenses due to equipment problems.

MODIFICATIONS AND EQUIVALENTS

Because of the modular approach utilized in the design of this computer system, a number of the hardware features outlined above are not required for the system to operate. Although each equipment omission involves some obvious tradeoffs in performance, the system is still able to accomplish its intended purpose. Some examples of the optional hardware features are outlined below.

Terminals: The design calls for the use of a CRT Terminal 27 and an associated Hard-Copy Device 30 (RO teletype equivalent). However, a KSR teletype (or equivalent) terminal may be substituted for both terminals above. The trade-off would involve slower printing of bills and waste of paper for transactions which would not normally require a hard copy.

Back-up Memory System 12: The CDR output from the PBX 10 may be connected directly to the Call-Pricing Computer 14, omitting both the Back-up Memory System 12 and A/B Switch 16. This configuration would sacrifice the redundancy feature provided by the Back-up Memory System 12, and hence an increase in the probability of a hardware failure which would cause the loss of call records.

Uninterruptable Power Supply 28: The Uninterruptable Power Supply (UPS) 28 insures the performance of the system in the event of a power failure or other fluctuation in the power furnished to the Call-Pricing Computer 14 which might adversely affect its performance. If the UPS 28 is omitted, then the system would be susceptible to these problems, and hence its overall integrity would be correspondingly sacrificed.

In each case outlined above, the system would continue to function as designed, because of the redundant nature of the design, but some degree of performance would be sacrificed.

While we have shown and described herein certain embodiments of our invention, we intend to cover as well every change or modification therein which may be made without departing from the spirit and scope of the invention.

We claim as our invention:

1. A system for processing and billing records of telephone calls made from a plurality of stations located in an institution having a transient population of n persons, said system comprising in combination,
    at least n stations which comprise dial-telephone equipment capable of placing outgoing long-distance telephone calls billable by a long-distance telephone company to said institution,
    a private-business-exchange (PBX) means connected to said n stations, said PBX means including a call-detail-recording (CDR) means which generates and stores signals which record the digits dialed, the trunk group used, the duration of the call, and a time of day for one end of a call,
    a backup memory means of such capacity as to be able to record upon its internal random-access memory said call-detail-recording signals for approximately at least 7,000 calls,
    a call-pricing computer means,
    means selectively connecting said PBX means to said backup memory means and said call-pricing computer means,
    an institution computer means which operates to maintain records of the census and locations of the n persons comprising the population of said institution and the charges applicable to the account of each during their stay with said institution,
    a control-console cathode-ray tube means (CCCRTM) operatively connected to said call-pricing-computer means,
    a printer means operatively connected to said CCCRTM,
    means linking said backup memory means to said institution computer means, and
    means linking said institution computer means with said call-pricing computer means for bidirectional transmission of signals therebetween.

2. A system as defined in claim 1, wherein said back-up-memory means has its own emergency power supply.

3. A system as defined in claim 1, in which said system further comprises an uninterruptable powersupply means operatively connected to said callpricing computer means, to said CCCRTM, and to said printer means.

4. A system as defined in claim 3, wherein said back-up-memory means has its own emergency power supply.

5. A system as defined in claim 3, in which said system further comprises dial-up line means containing an input-output modem for generating and conveying query signals to said call-pricing computer means.

6. A system as defined in claim 5, wherein said back-up-memory means has its own emergency power supply.

7. A system as defined in claim 1, in which said system further comprises dial-up line means containing an input-output modem for generating and conveying query signals to said call-pricing computer means.

8. A system as defined in claim 7, wherein said back-up-memory means has its own emergency power supply.

9. A system for processing and billing records of telephone calls made from a plurality of stations located in an institution having a transient population of n persons, said system comprising, in combination, at least n stations which comprise dial-telephone equipment capable of placing outgoing long-distance telephone calls billable by a long-distance telephone company to said institution, a private-business-exchange (PBX) means connected to said n stations, said PBX means including a call-detail-recording (CDR) means which generates and stores signals which record the identity of the one of said n stations from which the call originated, the digits dialed, the trunk group used, the duration of the call, and the time of day for one end of the call, a call-pricing computer means, and means connecting said PBX means to said call-pricing computer means.

10. A system as defined in claim 9, comprising a backup memory means of such capacity as to be able to record upon its internal random-access memory said call-detail-recording signals, an institution computer means which operates to maintain records of the census and locations of the n persons comprising the population of said institution and the charges applicable to the account of each during their stay with said institution, means selectively connecting said PBX means to said backup memory means, a control-console cathode-ray tube means (CCCRTM) operatively connected to said call-pricing-computer means, a printer means operatively connected to said CCCRTM, means linking said backup memory means to said institution computer means, and means linking said institution computer means with said call-pricing computer means for bidirectional transmission of signals therebetween.

11. A system as defined in claim 9, comprising a backup memory means of such capacity as to be able to record upon its internal random-access memory said call-detail-recording signals, an institution computer means which operates to maintain records of the census and locations of the n persons comprising the population of said institution and the charges applicable to the account of each during their stay with said institution, means selectively connecting said PBX means to said call-pricing computer means, a control-console cathode-ray tube means (CCCRTM) operatively connected to said call-pricing-computer means, a printer means operatively connected to said CCCRTM, means linking said back-up memory means to said institution computer means, and means linking said institution computer means with said call-pricing computer means for bidirectional transmission of signals therebetween.

12. A system as defined in claim 9, comprising a backup memory means of such capacity as to be able to record upon its internal random-access memory said call-detail-recording signals, an institution computer means which operates to maintain records of the census and locations of the n persons comprising the population of said institution and the charges applicable to the account of each during their stay with said institution, means selectively connecting said PBX means to said back-up memory means and to said call-pricing computer means, a control-console cathode-ray tube means (CCCRTM) operatively connected to said call-pricing-computer means, a printer means operatively connected to said CCCRTM, means linking said back-up memory means to said institution computer means, and means linking said institution computer means with said call-pricing computer means for bidirectional transmission of signals there between.

13. A system as defined in claim 9, in which said system further comprises an unauthorized-call-detection means.

14. A system as defined in claim 9, in which said system further comprises a high-usage detection means.

15. A system as defined in claim 9, in which said system further comprises a credit-debit calculation and signaling means.

* * * * *